Feb. 28, 1967 B. A. SHOOR 3,307,054

ACCELEROMETER

Filed Feb. 12, 1960

INVENTOR.
BERNARD A. SHOOR
BY Reed C. Lawlor
ATTORNEY

United States Patent Office 3,307,054
Patented Feb. 28, 1967

3,307,054
ACCELEROMETER
Bernard A. Shoor, Pasadena, Calif., assignor to Endevco Corporation, Pasadena, Calif., a corporation of California
Filed Feb. 12, 1960, Ser. No. 8,444
14 Claims. (Cl. 310—8.4)

This invention relates to accelerometers and particularly to accelerometers employing piezoelectric material for generating electrical signals in accordance with accelerations or vibrations to be detected.

In an accelerometer to which this invention applies, an annular or similarly contoured sensing element is mounted in a cylindrical or other peripheral case or housing, providing a chamber for the element, and also providing mounting means along its central axis for mounting the accelerometer on a device or mechanism or other object to be tested in any required angular position and for shifting such accelerometer rotatably about its axis. One face of the sensing element mounted in the mentioned chamber, which element typically is a piezoelectric crystal, is positioned in fixed relationship with a wall of the housing, another face of the crystal being in contact with an annular or peripheral inertial member or mass. The piezoelectric crystal element is connected to an electric circuit for detecting, indicating or recording electrical signals generated by the piezoelectric element in response to accelerations or vibrations of the case or housing in a direction parallel to the central or concentric axis of the accelerometer when it is mounted upon a vibrating object. The crystal element is polarized with its polarization axis parallel to the central axis of the crystal element and of the housing.

The annular piezoelectric crystal element may be mounted under longitudinal compression between a wall of the casing and the inertial element, or it may be mounted in the shear mode between a central part of the casing and the annular inertial member. By polarizing the piezoelectric element and disposing its axis of polarization parallel to the axis of vibration of the vibrating object, and by mounting the piezoelectric element in shear relationship between the housing and the inertial member as indicated, the accelerometer develops charges at the concentric cylindrical faces when subjected to longitudinal, or axial, shearing forces. With this arrangement, very low cross-axis sensitivity can be attained and the resonance characteristics of the system are little affected by the resonant characteristics of the case.

It is therefore an object of this invention to provide improved accelerometers in which piezoelectric elements are annular and are mounted in either the shear mode or the compression mode or relationship between inertial or mass members and the housing or body members to be vibrated by the objects or apparatus being tested, whereby to generate electrical output.

It is a further object to provide a housing or casing for such an accelerometer with an axial bore provided to receive a machine screw, thereby making it possible to mount the accelerometer on the instrument or machine to be tested, through the employment of an axially disposed screw which is itself insulated to reduce spurious signal phenomena and which provides for rotational adjustment of the accelerometer to provide for the desired mounting.

A still further object of the invention is to provide a very small and very efficient accelerometer that may be disposed in a small space or in a corner closely adjacent a wall, and that may be adjustably anchored therein by use of an axially disposed screw to direct a projecting connector away from such wall.

It is also an object to provide for such purposes an accelerometer which is so small that it has a diameter only about twice the length of a projecting cable connector which is required to connect the annular piezoelectric crystal element to appropriate detecting, indicating or recording means.

Other objects and features of the invention will become apparent to those skilled in this art upon reference to the following specification and the accompanying drawing wherein certain embodiments of this invention are disclosed.

In the drawing:

FIG. 1 is a vertical transverse section on an enlarged scale through an accelerometer of this improvement carrying an annular piezoelectric crystal member mounted in shear mode or relationship between an inner circular housing portion or body member and an inertial member or mass suspended within an outer circular housing portion by the annular piezoelectric member, electrical connection of the crystal member with an amplifier and a recorder being schematically represented;

To simplify the description, the accelerometers of FIGS. 1–4 will all be described as though mounted with their sensitive axes V—V vertical, so that they respond to the vertical components of the acceleration or vibration of the objects on which they are mounted. In these accelerometers, the annular piezoelectric crystal member of each is polarized along an axis parallel to the vertical axis V—V of the housing. This axis V—V of the housing is also the axis about which the housing is rotatably adjustable for mounting in close quarters as in FIG. 4. The vibrating force acting on a mounted accelerometer is thus parallel to the polarization axis of its piezoelectric crystal, and the axis of the housing.

Piezoelectric crystal materials for such purposes are well known. One such material is the ceramic barium titanate in crystalline state. Others are lead metaniobate, cadmium niobate, sodium niobate, a mixture of lead titanate and lead zirconate, and many others, including natural crystals such as quartz. The former materials have much higher dielectric constants than quartz, and they also have higher shear and compressive piezoelectric coefficients than quartz. While quartz is polarized in its natural state, the other materials specifically mentioned are not. The ceramic piezoelectric crystalline materials are readily polarized artificially by known methods for accelerometer use. In one such method, the material is subjected to strong electric fields while the material is above its transition temperature. Upon cooling in the electric field, the material develops piezoelectric properties and in particular develops a polarization axis in a direction parallel to the electric field.

Figure 1:
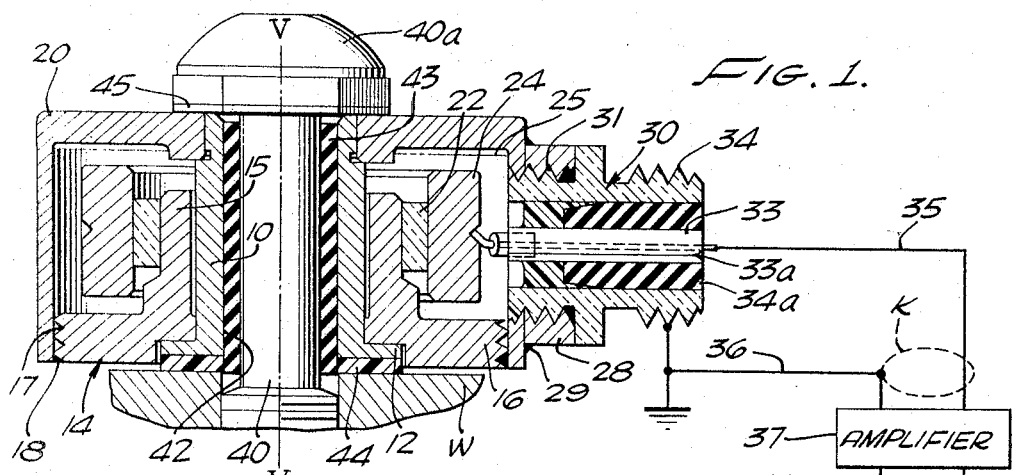

With reference to the structure illustrated in FIG. 1, a circular, or cylindrical, body member 10 having an integral radial outwardly-extending flange 12 is used for mounting the accelerometer directly upon an instrument or piece of work or object W to be tested. This body member 10 receives a circular crystal holder or support 14 which is either brazed or press-fitted thereon. The body member 10 includes an upstanding crystal-receiving sleeve 15 and a radially outwardly extending flange or base 16, these being borne upon the flange 12 of the body member 10. The periphery of the circular base 16 is threaded at 17 and receives in sealed relation, as indicated at 18, the lower edge of an inverted cup-shaped outer housing 20.

An annular piezoelectric member 22, such as above described, is snugly fitted over the sleeve 15 in shear mode and snugly receives an annular inertial member or mass 24. The inertial mass 24 and the piezoelectric crystal member 22 are thus contained within an annular chamber 25 which is enclosed by the outer cup-shaped housing 20 and an inner housing portion formed by the body member 10 and the crystal holder 14 with its base 16. Though not necessary to provide damping, when damping is desired, the chamber 25 is filled with viscous damping means such as a body of oil or other insulating liquid or a body of sponge rubber or the like. The case 20, support 14 and mass member 24 are made of metal, and together with the annular crystal 22 are concentrically mounted about the axis V—V.

The vibration force acting on the described housing members along the vibration axis V—V and the polarization axis of the crystal 22 causes the inertial member 24 to develop an equal and opposite force which places the crystal 22 in shear along such axis and develops a voltage difference across the two opposite parallel cylindrical surfaces of the annular piezoelectric crystal 22. For the purpose of utilizing such voltage effects, a collar 28 is brazed at 29 to an upstanding wall portion of the outer housing 20 to receive a cable connector 30 having a threaded inner fitting 31 threaded securely into the collar 28 and the adjacent wall portion of the housing 20 and appropriately sealed.

A flexible lead 32 has one end soldered to the inertial member 24 and the other end soldered to the inner end of a connector terminal 33 insulatingly mounted coaxially, as at 34a, within a threaded fitting 34 of the connector 30. The outer end of the terminal 33 is provided with a split receptacle 33a.

The threaded fitting 34 and the receptacle 33a are adapted to make electrical connection with a suitable connector of a conventional coaxial cable (diagrammatically indicated at K) having a center lead 35 that connects with the terminal 33 and an external lead member 36. The two leads 35 and 36 connect the opposite faces of the crystal element 22 to the input of an amplifier 37 and a recorder 38 which are representative of any desired means to receive and indicate or record the electrical effects caused by vibration or acceleration of the piece of work W under investigation. With this arrangement, indications of the electrical output resulting from shearing of the piezoelectric crystal 22 are obtained.

Figure 4:
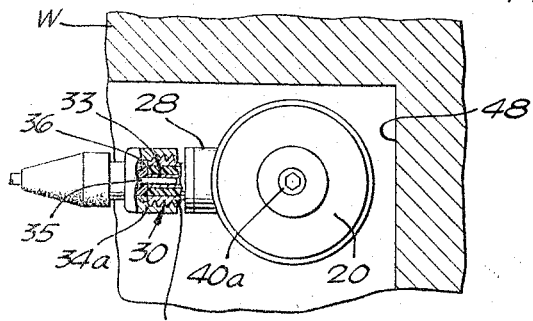
FIG. 4 is a plan view on a reduced scale of an accelerometer of the improvement illustrated as mounted in a cramped corner of a piece of work normally inaccessible to conventional accelerometers.

In order to install an accelerometer of this improvement close to a corner of the piece of work W and other spots difficult of access and offering very small space, and where it is necessary to mount the accelerometer close to a wall as depicted in FIG. 4, the accelerometer is made capable of attachment to the work by a machine screw 40 or the like disposed at the axis V—V so that engagement of the connector 30 and its threaded fitting 34 with the adjacent wall of the work W can be avoided while the accelerometer is being secured to the object. This invention also makes it possible to utilize a cable of minimum length, since the connector 30 can always be directed toward the main body of the cable and eliminating unnecessary cable twisting at the accelerometer. The latter feature is especially important where the cable is permanently attached to the accelerometer.

Such a screw 40 is desirably provided with a head 40a capable of receiving a screw driver, such as an Allen head or a Bristol head or the like. The shank 40 of the screw is received through an axial bore 42 in the body member 10 containing a cylindrical insulating sleeve 43. At the under side of the structure, an insulating ring 44 is provided for bearing upon the adjacent surface of the work W. This ring 44 preferably is an anodized aluminum washer which is permanently cemented in place on the under side of the flange 12 of the body member 10. The thickness of this insulating washer 44 is such that a portion of it lies above the under face of the base 16 of the support 14, the remainder projecting below such under face sufficiently to space the accelerometer housing from the adjacent work W, the anodized surface acting as an insulator. At the upper end of the shank of the screw 40, another insulating washer 45 is positioned between the screw head 40a and the top of the housing 20. This washer 45 may be like or similar to the washer 44.

With the above arrangement, it is easy to locate the accelerometer closely adjacent a wall 48 of the work W being tested, with the connector 30 directed away from such wall. The screw 40 may then be readily seated with a suitable tool. Since accelerometers of this type are usually exceedingly small, the projecting cable connector 30 may extend out from the wall of the housing 20 a substantial distance, such as about one-fourth inch, whereas the diameter of the accelerometer is characteristically only about one-half inch. Such dimensions and proportions become very important in small access spaces.

Figure 2:
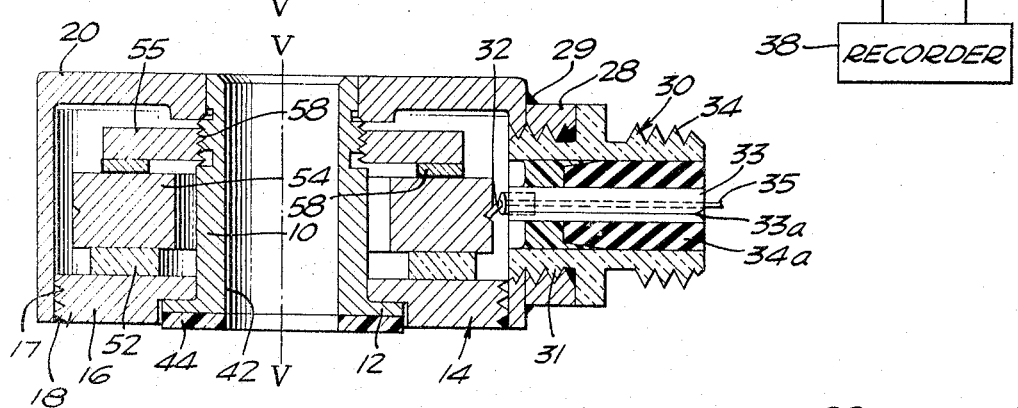
FIG. 2 is a view similar to that of FIG. 1 showing an accelerometer wherein the annular piezoelectric member is mounted in compression through the agency of a pressure device.

In FIG. 2 there is disclosed a modification of the accelerometer of FIG. 1 wherein the annular construction of the piezoelectric crystal is retained, but these annular crystals are precompressed in the direction of the vibration axis V—V instead of being utilized in the shear mode. Thus, in FIG. 2, an annular piezoelectric crystal 52, which is flat rather than vertically elongated as in the case of the crystal 22, in mounted upon the upper surface of the support 14 and its annular extension or base portion 16, and upon the crystal 52 there is mounted an annular inertial member or mass in the form of a vertically thick ring 54 which generally corresponds with the mass 24 of FIG. 1. A resilient pressure ring 55 is theaded at 56 onto the upper portion of the body member 10 and is turned down against an insulating spacer ring 58 lying upon the inertial mass ring 54. The ring 58 is composed of aluminum and is anodized on its lower side. In this manner, a compression force is applied to the annular crystal 52, and the weight of the inertial mass ring 54 is added thereto or subtracted therefrom depending upon whether the accelerometer is mounted upright as shown or upside down. Electrical connection is made between the mass member 54 and the lead 35 in the same manner as with the mass member 24 of FIG. 1.

Figure 3:
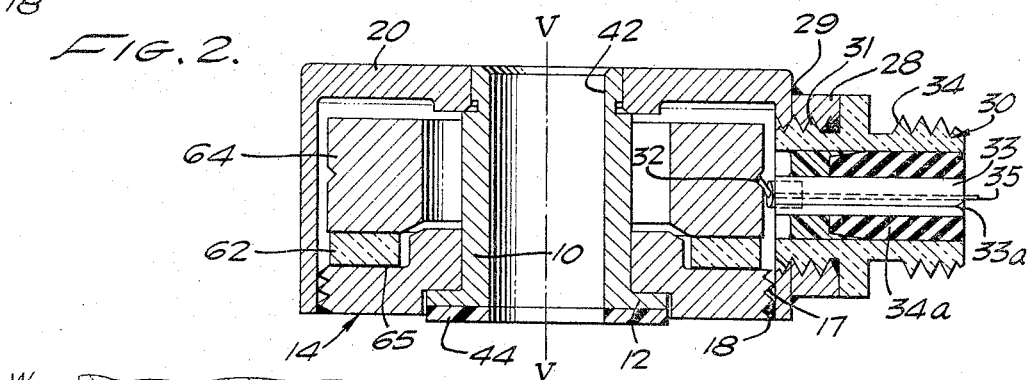
FIG. 3 is a view similar to those of FIGS. 1 and 2 wherein an annular piezoelectric crystal member is cemented to the crystal member which is in turn cemented to the housing.

In FIG. 3, a flat piezoelectric ring crystal 62 is used which is much like the crystal 52, and an inertial mass ring 64 much like the mass ring 54 of FIG. 2 is placed upon the ring crystal 62. Here, however, the compression ring 55 and spring 58 are omitted, and the mass of the interial member 64 is correspondingly increased. To maintain the relationship of the parts, the ring crystal 62 is permanently cemented at 65 to the upper face of the base 16 of the support member 14, and the ring mass 64 is permanently cemented to the top of the ring crystal 62. Here also, the mass ring 64 is electrically connected with the lead 35 to the amplifier 37 and recorder 38 or other instruments in the same manner as shown in FIG. 1 for the annular mass member 24. In this case, the crystal is slightly precompressed or slightly extended due to the weight of the ring 64 depending upon whether the accelerometer is mounted upright as shown or upside down.

In each of the forms shown in FIGS. 1, 2 and 3, the cylindrical construction of the housing member 20 and its rotatable mounting and adjustment by the machine screw 40 at its center vertical axis V—V are maintained, so that, upon drilling and tapping a corresponding hole for the screw 40 in the chosen seat of the work W, the accelerometer may be mounted very close to an upstanding wall 48 of the work, as indicated in FIG. 4. With such construction, rotating of the accelerometer into operating position, as is commonly required with prior accelerometers, is avoided, and installation in small spaces and closer to corner and adjacent walls is possible.

These cylindrical constructions offer further advantages, of which a very important advantage is that with the annular piezoelectric crystal members, a maximum amount of piezoelectric material is usable and, hence, maximum sensitivity is attainable in a very small space such as is provided in the very small accelerometer sizes mentioned above, namely, accelerometers with only about one-half inch diameters, and about three-eighths inch heights. Another advantage of the annular crystals is that they lend themselves to the very desirable preloading with annular means as in the structure of FIG. 2 using the pressure ring 55, and similarly to the use of relatively large inertial masses such as in the form of the annular rings 24, 54 and 64, whether the crystals and inertial rings be mounted in shear as in FIG. 1 or not as in FIGS. 2 and 3. Thus, the peripheral or annular distribution of the crystal means, and also of the inertial mass means, has great importance.

As will be apparent from the foregoing, there are provided by this invention desirable and highly effective accelerometer combinations employing annular piezoelectric crystal structures which are mounted to generate electrical outputs which are directly proportional to the accelerative or vibrational forces imparted by the work W undergoing investigation. Such structures lend themselves fully to complete sealing of the piezoelectric crystalline structures within the respective housings, as well as to their enclosures in suitable damping media. In practice the device is employed to detect signals having frequencies that are low compared with its resonant frequency. For example, in one unit an accelerometer having a resonant frequency of 30,000 c.p.s. was employed to detect accelerations in the range between 2 c.p.s to 8000 c.p.s. Also, since the cylinder that holds the crystal material and the base therefor may be machined in one piece at one time, very accurate perpendicularities and concentricities can be maintained, whereby to minimize cross-axis sensitivity.

Further, the use of the single central bore 42 with a single screw 40 makes it possible to adjust the accelerometer easily with the coaxial cable K, already attached to the connector thereof without excessive flexing and twisting of the cable, and additionally to avoid the shifting of the rotation of the accelerometer during use.

Although only a limited number of embodiments of the invention have been specifically disclosed and described herein, it will be obvious that the invention is not limited thereto but is capable of being embodied in other forms. Furthermore, the invention is not limited to the measurement of acceleration but may be employed in instruments that measure force or pressure. Various changes which will suggest themselves to those skilled in the art, after becoming familiar with the invention, may be made in the material, configuration, details of construction and arrangement of the elements without departing from the invention. Reference is therefore made to the claims to ascertain the scope of the invention.

I claim:

1. In an accelerometer:
   a housing having an annular holder member to be mounted on an accelerating object under investigation;
   an annular piezoelectric element mounted on and in contact with said holder member;
   an annular inertial mass member mounted on and in contact with said annular piezoelectric element, said annular members and element being concentric;
   and means connected with said housing providing a central bore having a central axis and extending through said housing and holding member for rotatably receiving mounting screw means.

2. An accelerometer as in claim 1 wherein said housing and bore carry insulating means for said screw means.

3. An accelerometer as in claim 1 wherein said inertial mass is cemented to said piezoelectric element.

4. An accelerometer as in claim 1 wherein said piezoelectric element is a polarized crystal member comprising ceramic crystalline material.

5. An accelerometer as in claim 1 including an outer housing member enclosing a chamber containing said annular members, and damping means filling said chamber.

6. An accelerometer as in claim 1 including screw means rotatably mounted in said bore and providing a manipulating head accessible from above said housing.

7. In an accelerometer:
   a sealed housing enclosing a chamber and having an annular holder member, said housing being mountable upon an accelerating object;
   an electric charge-generating structure peripherally arranged around said chamber within said housing and carried by said holder;
   an inertial mass member mounted upon said charge-generating member;
   and a bore through said housing providing a central axis around which said members are disposed, said bore providing for rotatably receiving a screw to mount said housing on said object.

8. An accelerometer as in claim 7 wherein said charge-generating structure includes piezoelectric means.

9. An accelerometer as in claim 7 including a cable connector arranged with its axis extending radially, said connector having two terminal elements connected to opposite sides of said annular charge-generating structure.

10. An accelerometer as in claim 1 including a cable connector projecting from a wall of said housing in a direction normal to said central axis, said connector having two terminal elements connected to opposite sides of said annular charge-generating structure.

11. An accelerometer as in claim 9 wherein the connector projects radially outwardly from said housing.

12. In an accelerometer:
   a sealed housing providing a chamber of annular configuration, said housing including a central member provided with an axial bore extending through said housing, said central member being encircled by said chamber;
   means including an electric charge-generating structure enclosed within said housing and sealed therein from the outer atmosphere for developing electric signals in response to acceleration of said housing along the axis thereof; and
   laterally extending means projecting radially from said housing and including conductive means connected to said electric charge-generating structure for communicating electrical signals developed by said electric charge-generating structure to an external circuit.

13. An accelerometer as defined in claim 12 in which said housing comprises a central tubular member providing said axial bore and laterally extending annular wall means providing end walls extending outwardly from said tubular member, and means defining an annular side wall member joining said end wall members and forming said annular chamber.

14. An accelerometer as defined in claim 12 wherein said electric charge-generating structure is of annular configuration and is provided with two opposite ring-shaped surfaces between which an electric field is generated in response to acceleration of said case and in which said electric conducting means comprises conductors electrically connected to the respective faces.

References Cited by the Examiner

UNITED STATES PATENTS 2,411,401  11/1946  Welch _____ 310—8.4
2,488,586  11/1949  Diemer _____ 310—8.4

OTHER REFERENCES

The National Bureau of Standards "Miniature Piezoelectric Accelerometer," November 1951, published in Radio-Electronic Engineering of Radio and Television News.

MILTON O. HIRSHFIELD, *Primary Examiner.*

GEORGE W. WESTBY, ELI J. SAX, *Examiners.*

M. REICH, J. R. GOUDEAU, J. D. MILLER,
*Assistant Examiners.*